(12) United States Patent
Ben Dayan et al.

(10) Patent No.: US 11,693,738 B2
(45) Date of Patent: *Jul. 4, 2023

(54) STORAGE SYSTEM SPANNING MULTIPLE FAILURE DOMAINS

(71) Applicant: Weka.IO Ltd, Tel Aviv (IL)

(72) Inventors: Maor Ben Dayan, Tel Aviv (IL); Omri Palmon, Tel Aviv (IL); Liran Zvibel, Tel Aviv (IL); Kanael Arditti, Tel Aviv (IL)

(73) Assignee: Weka.IO Ltd. (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,651

(22) Filed: Jul. 11, 2022

(65) Prior Publication Data

US 2022/0342756 A1 Oct. 27, 2022

Related U.S. Application Data

(63) Continuation of application No. 17/173,252, filed on Feb. 11, 2021, now Pat. No. 11,422,893, which is a continuation of application No. 16/275,737, filed on Feb. 14, 2019, now Pat. No. 10,942,807.

(60) Provisional application No. 62/683,841, filed on Jun. 12, 2018.

(51) Int. Cl.
*G06F 11/10* (2006.01)
*G06F 3/06* (2006.01)

(52) U.S. Cl.
CPC ........ *G06F 11/1076* (2013.01); *G06F 3/0619* (2013.01); *G06F 3/0644* (2013.01); *G06F 3/0689* (2013.01)

(58) Field of Classification Search
None
See application file for complete search history.

(56) References Cited

U.S. PATENT DOCUMENTS

| | | |
|---|---|---|
| 6,487,636 B1 | 11/2002 | Dolphin et al. |
| 7,340,640 B1 | 3/2008 | Karr et al. |
| 7,447,839 B2 | 11/2008 | Uppala |
| 7,681,072 B1 | 3/2010 | Gibson et al. |
| 7,793,146 B1 | 9/2010 | Gibson et al. |
| 7,971,089 B2 | 6/2011 | Yoshikawa et al. |
| 8,060,779 B2 | 11/2011 | Beardsley et al. |
| 8,522,073 B2 | 8/2013 | Cohen |
| 8,645,749 B2 | 2/2014 | Reche |
| 8,918,478 B2 | 12/2014 | Ozzie et al. |

(Continued)

FOREIGN PATENT DOCUMENTS

JP 2018022530 2/2018

OTHER PUBLICATIONS

Int'l Search Report and Written Opinion Appln No. PCT/IB2016/001177 dated Dec. 2, 2016.

(Continued)

*Primary Examiner* — Guerrier Merant
(74) *Attorney, Agent, or Firm* — McAndrews, Held & Malloy, Ltd.

(57) ABSTRACT

A plurality of failure domains are communicatively coupled to each other via a network, and each of the plurality of failure domains is coupled to one or more storage devices. A failure resilient stripe is distributed across the plurality of storage devices, such that two or more blocks of the failure resilient stripe are located in each failure domain.

20 Claims, 5 Drawing Sheets

(56) References Cited

U.S. PATENT DOCUMENTS

| | | |
|---|---|---|
| 9,087,012 B1 | 7/2015 | Hayes et al. |
| 9,448,887 B1 | 9/2016 | Ben Dayan et al. |
| 9,477,554 B2 | 10/2016 | Hayes |
| 9,547,458 B2 | 1/2017 | Harnik et al. |
| 2005/0229023 A1 | 10/2005 | Lubbers et al. |
| 2010/0199125 A1 | 8/2010 | Reche |
| 2013/0036340 A1 | 2/2013 | Kidney et al. |
| 2015/0280748 A1 | 10/2015 | Gendler et al. |
| 2015/0355971 A1 | 12/2015 | Becker-Szendy et al. |
| 2016/0041887 A1* | 2/2016 | Davis ................. G06F 11/1612 714/6.2 |
| 2016/0246677 A1 | 8/2016 | Sangamkar et al. |
| 2016/0357634 A1 | 12/2016 | Wang et al. |

OTHER PUBLICATIONS

Int'l Preliminary Report on Patentability Appln No. PCT/IB2019/000688 dated Dec. 24, 2020.
Int'l Search Report and Written Opinion Appln No. PCT/IB2019/000688 dated Mar. 18, 2020.
Supplementary European Search Report Appln No. 19819005.0 dated Feb. 17, 2022.
Supplementary European Search Report Appln No. 19819005.0 dated May 19, 2022.
Japanese Office Action Appln No. 2020569858 dated Dec. 16, 2022.

* cited by examiner

STORAGE SYSTEM SPANNING MULTIPLE FAILURE DOMAINS

PRIORITY CLAIM

This application claims priority to the following application, which is hereby incorporated herein by reference: U.S. provisional patent application 62/683,841 titled "STORAGE SYSTEM SPANNING MULTIPLE FAILURE DOMAINS" filed on Jun. 12, 2018.

BACKGROUND

Limitations and disadvantages of conventional approaches to data storage will become apparent to one of skill in the art, through comparison of such approaches with some aspects of the present method and system set forth in the remainder of this disclosure with reference to the drawings.

INCORPORATION BY REFERENCE

U.S. patent application Ser. No. 15/243,519 titled "Distributed Erasure Coded Virtual Filesystem" is hereby incorporated herein by reference in its entirety.

BRIEF SUMMARY

Methods and systems are provided for building a storage system spanning multiple failure domains in a distributed filesystem substantially as illustrated by and/or described in connection with at least one of the figures, as set forth more completely in the claims.

DETAILED DESCRIPTION

Traditionally, filesystems use a centralized control over the metadata structure (e.g., directories, files, attributes, file contents). If a local filesystem is accessible from a single server and that server fails, the filesystem's data may be lost if as there is no further protection. To add protection, some filesystems (e.g., as provided by NetApp) have used one or more pairs of controllers in an active-passive manner to replicate the metadata across two or more computers. Other solutions have used multiple metadata servers in a clustered way (e.g., as provided by IBM GPFS, Dell EMC Isilon, Lustre, etc.). However, because the number of metadata servers in a traditional clustered system is limited to small numbers, such systems are unable to scale.

The systems in this disclosure are applicable to small clusters and can also scale to many, many thousands of nodes. An example embodiment is discussed regarding non-volatile memory (NVM), for example, flash memory that comes in the form of a solid-state drive (SSD). The NVM may be divided into 4 kB blocks and 128 MB chunks. Extents may be stored in volatile memory, e.g., RAM for fast access, backed up by NVM storage as well. An extent may store pointers for blocks, e.g., 256 pointers to 1 MB of data stored in blocks. In other embodiments, larger or smaller memory divisions may also be used. Metadata functionality in this disclosure may be effectively spread across many servers. For example, in cases of "hot spots" where a large load is targeted at a specific portion of the filesystem's namespace, this load can be distributed across a plurality of nodes.

Figure 1:
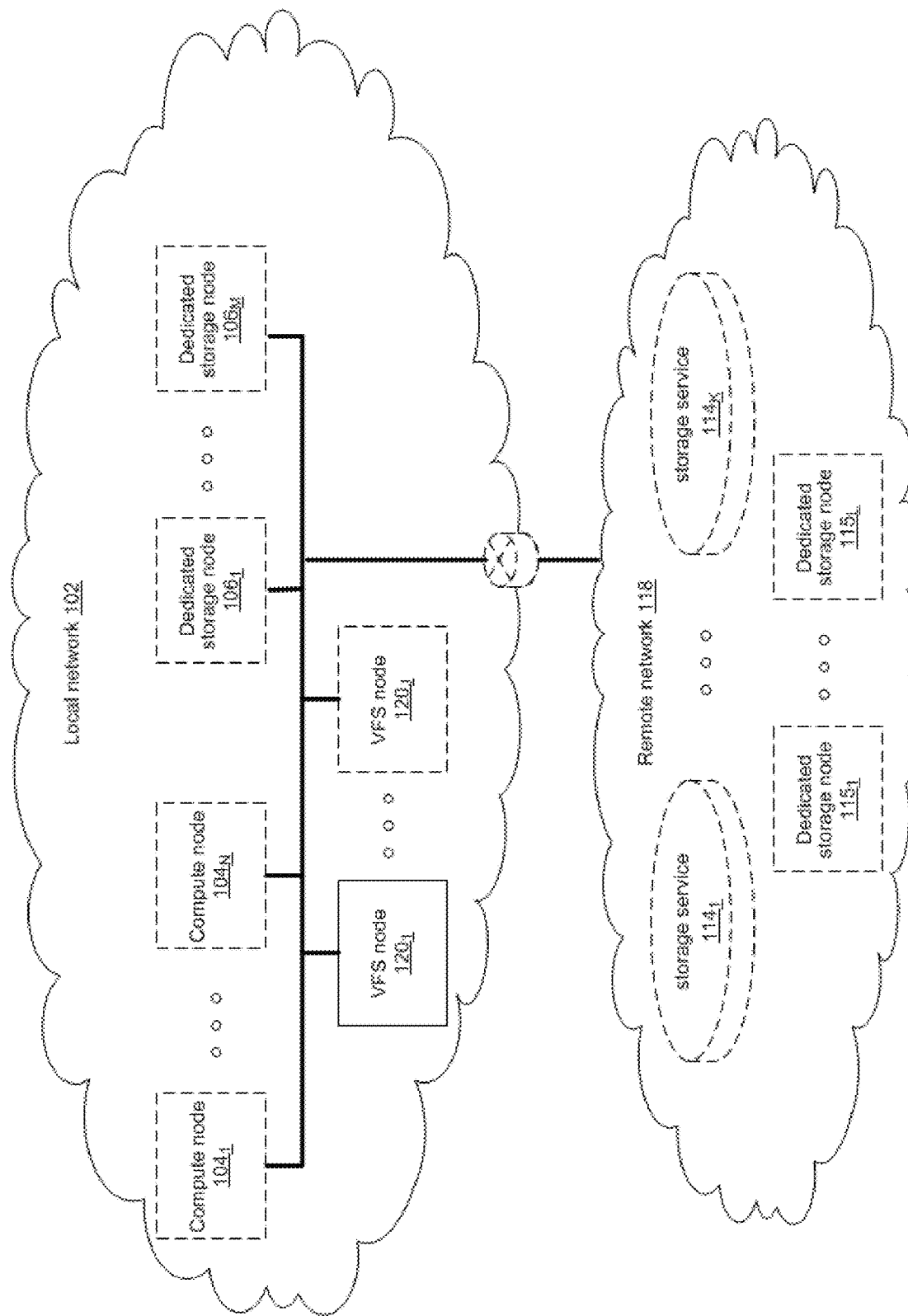
FIG. 1 illustrates various example configurations of a distributed filesystem in accordance with aspects of this disclosure.

FIG. 1 illustrates various example configurations of a distributed filesystem in accordance with aspects of this disclosure. Shown in FIG. 1 is a local area network (LAN) 102 comprising one or more nodes 120 (indexed by integers from 1 to J, for $j \geq 1$), and optionally comprising (indicated by dashed lines): one or more dedicated storage nodes 106 (indexed by integers from 1 to M, for $M \geq 1$), one or more compute nodes 104 (indexed by integers from 1 to N, for $N \geq 1$), and/or an edge router that connects the LAN 102 to a remote network 118. The remote network 118 optionally comprises one or more storage services 114 (indexed by integers from 1 to K, for $K \geq 1$), and/or one or more dedicated storage nodes 115 (indexed by integers from 1 to L, for $L \geq 1$).

Each node $120_j$ (j an integer, where $1 \leq j \leq J$) is a networked computing device (e.g., a server, personal computer, or the like) that comprises circuitry for running processes (e.g., client processes) either directly on an operating system of the device $104_n$ and/or in one or more virtual machines running in the device $104_n$.

The compute nodes 104 are networked devices that may run a virtual frontend without a virtual backend. A compute node 104 may run a virtual frontend by taking a single root input/output virtualization (SR-IOV) into the network interface card (NIC) and consuming a complete processor core. Alternatively, the compute node 104 may run the virtual frontend by routing the networking through a Linux kernel networking stack and using kernel process scheduling, thus not having the requirement of a full core. This is useful if a user does not want to allocate a complete core for the filesystem or if the networking hardware is incompatible with the filesystem requirements.

Figure 2:
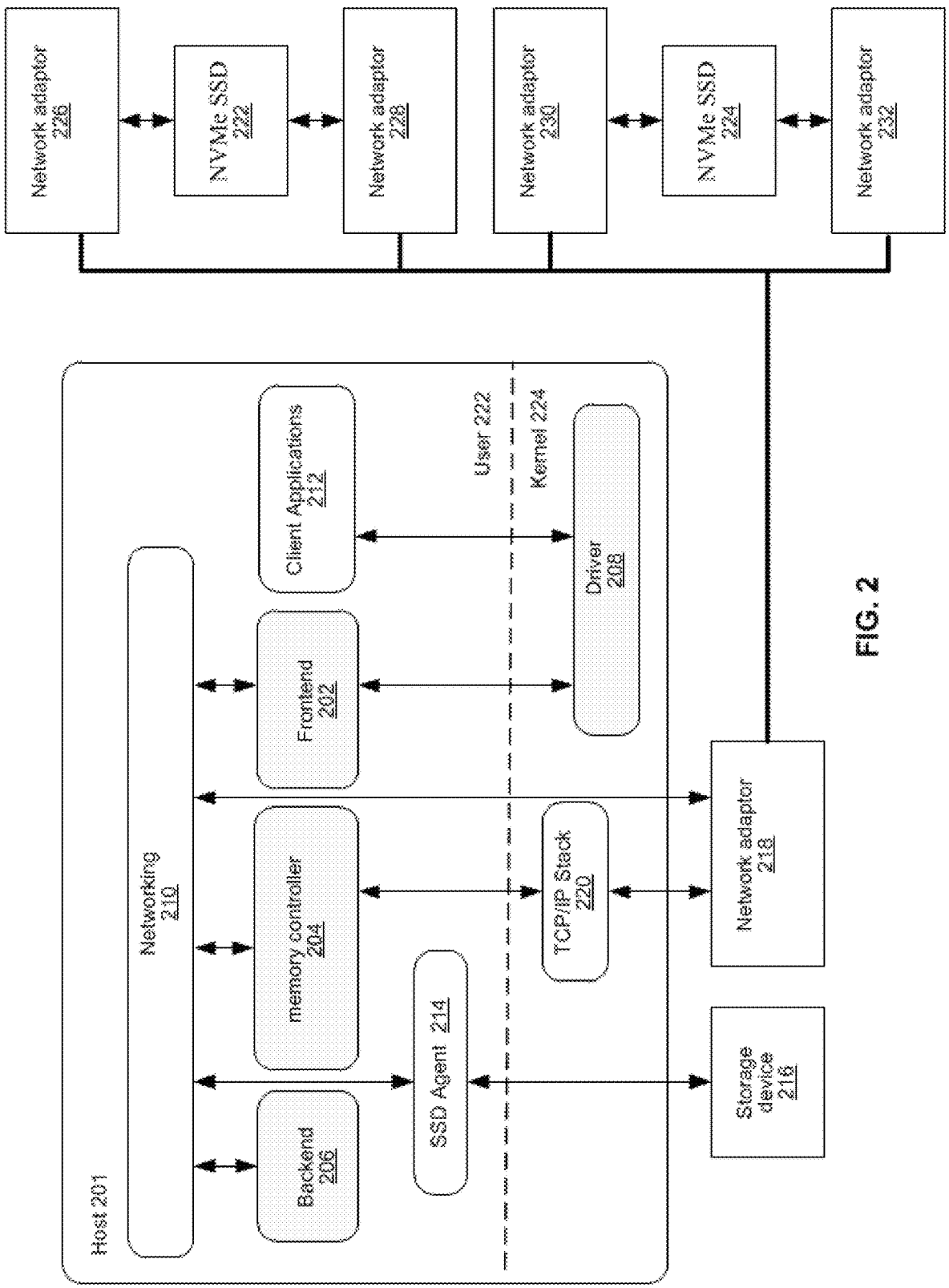
FIG. 2 illustrates an example configuration of a distributed filesystem node in accordance with aspects of this disclosure.

FIG. 2 illustrates an example configuration of a node in accordance with aspects of this disclosure. A node comprises a frontend 202 and driver 208, a memory controller 204, a backend 206, and an SSD agent 214. The frontend 202 may be a virtual frontend; the memory controller 204 may be a virtual memory controller; the backend 206 may be a virtual backend; and the driver 208 may be a virtual drivers. As used in this disclosure, a virtual filesystem (VFS) process is a process that implements one or more of: the frontend 202, the memory controller 204, the backend 206, and the SSD agent 214. Thus, in an example implementation, resources (e.g., processing and memory resources) of the node may be shared among client processes and VFS processes. The processes of the VFS may be configured to demand relatively small amounts of the resources to minimize the impact on the performance of the client applications. The frontend 202, the memory controller 204, and/or the backend 206 and/or the SSD agent 214 may run on a processor of the host 201 or on a processor of the network adaptor 218. For a multi-core processor, different VFS process may run on different cores, and may run a different subset of the services. From the perspective of the client process(es) 212, the interface with the virtual filesystem is independent of the particular physical machine(s) on which the VFS process(es) are running. Client processes only require driver 208 and frontend 202 to be present in order to serve them.

The node may be implemented as a single tenant server (e.g., bare-metal) running directly on an operating system or as a virtual machine (VM) and/or container (e.g., a Linux container (LXC)) within a bare-metal server. The VFS may run within an LXC container as a VM environment. Thus, inside the VM, the only thing that may run is the LXC container comprising the VFS. In a classic bare-metal environment, there are user-space applications and the VFS runs in an LXC container. If the server is running other containerized applications, the VFS may run inside an LXC container that is outside the management scope of the container deployment environment (e.g. Docker).

The node may be serviced by an operating system and/or a virtual machine monitor (VMM) (e.g., a hypervisor). The VMM may be used to create and run the node on a host 201. Multiple cores may reside inside the single LXC container running the VFS, and the VFS may run on a single host 201 using a single Linux kernel. Therefore, a single host 201 may comprise multiple frontends 202, multiple memory controllers 204, multiple backends 206, and/or one or more drivers 208. A driver 208 may run in kernel space outside the scope of the LXC container.

A SR-IOV PCIe virtual function may be used to run the networking stack 210 in user space 222. SR-IOV allows the isolation of PCI Express, such that a single physical PCI Express can be shared on a virtual environment and different virtual functions may be offered to different virtual components on a single physical server machine. The I/O stack 210 enables the VFS node to bypasses the standard TCP/IP stack 220 and communicate directly with the network adapter 218. A Portable Operating System Interface for uniX (POSIX) VFS functionality may be provided through lockless queues to the VFS driver 208. SR-IOV or full PCIe physical function address may also be used to run non-volatile memory express (NVMe) driver 214 in user space 222, thus bypassing the Linux IO stack completely. NVMe may be used to access non-volatile storage media 216 attached via a PCI Express (PCIe) bus. The non-volatile storage media 220 may be, for example, flash memory that comes in the form of a solid-state drive (SSD) or Storage Class Memory (SCM) that may come in the form of an SSD or a memory module (DIMM). Other example may include storage class memory technologies such as 3D-XPoint.

The SSD may be implemented as a networked device by coupling the physical SSD 216 with the SSD agent 214 and networking 210. Alternatively, the SSD may be implemented as a network-attached NVMe SSD 222 or 224 by using a network protocol such as NVMe-oF (NVMe over Fabrics). NVMe-oF may allow access to the NVMe device using redundant network links, thereby providing a higher level or resiliency. Network adapters 226, 228, 230 and 232 may comprise hardware acceleration for connection to the NVMe SSD 222 and 224 to transform them into networked NVMe-oF devices without the use of a server. The NVMe SSDs 222 and 224 may each comprise two physical ports, and all the data may be accessed through either of these ports.

Each client process/application 212 may run directly on an operating system or may run in a virtual machine and/or container serviced by the operating system and/or hypervisor. A client process 212 may read data from storage and/or write data to storage in the course of performing its primary function. The primary function of a client process 212, however, is not storage-related (i.e., the process is only concerned that its data is reliably stored and is retrievable when needed, and not concerned with where, when, or how the data is stored). Example applications which give rise to such processes include: email servers, web servers, office productivity applications, customer relationship management (CRM), animated video rendering, genomics calculation, chip design, software builds, and enterprise resource planning (ERP).

A client application 212 may make a system call to the kernel 224 which communicates with the VFS driver 208. The VFS driver 208 puts a corresponding request on a queue of the VFS frontend 202. If several VFS frontends exist, the driver may load balance accesses to the different frontends, making sure a single file/directory is always accessed via the same frontend. This may be done by sharding the frontend based on the ID of the file or directory. The VFS frontend 202 provides an interface for routing filesystem requests to an appropriate VFS backend based on the bucket that is responsible for that operation. The appropriate VFS backend may be on the same host or it may be on another host.

A VFS backend 206 hosts several buckets, each one of them services the filesystem requests that it receives and carries out tasks to otherwise manage the virtual filesystem (e.g., load balancing, journaling, maintaining metadata, caching, moving of data between tiers, removing stale data, correcting corrupted data, etc.)

A VFS SSD agent 214 handles interactions with a respective storage device 216. This may include, for example, translating addresses, and generating the commands that are issued to the storage device (e.g., on a SATA, SAS, PCIe, or other suitable bus). Thus, the VFS SSD agent 214 operates as an intermediary between a storage device 216 and the VFS backend 206 of the virtual filesystem. The SSD agent 214 could also communicate with a standard network storage device supporting a standard protocol such as NVMe-oF (NVMe over Fabrics).

Figure 3:
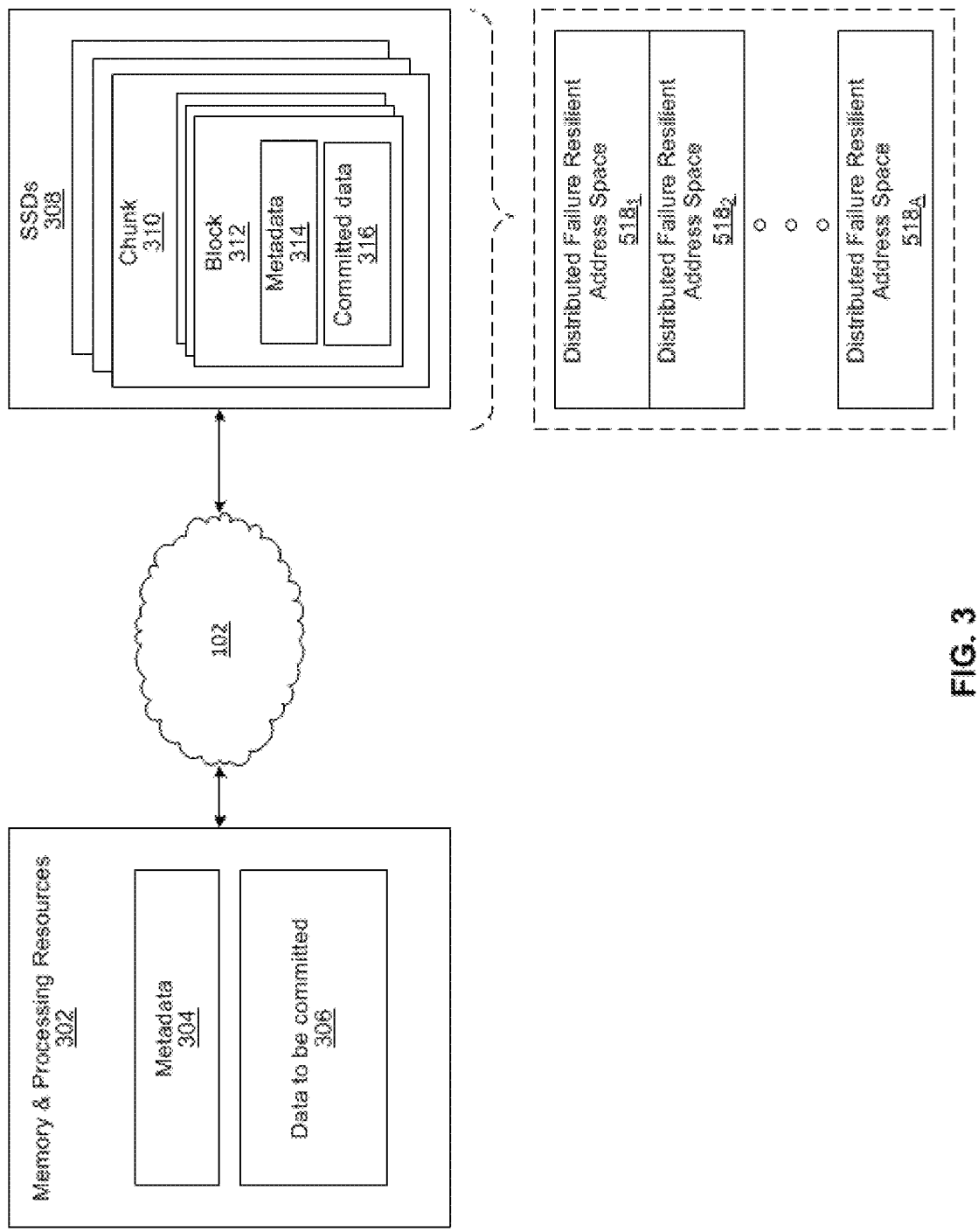
FIG. 3 illustrates another representation of a distributed filesystem in accordance with an example implementation of this disclosure.

FIG. 3 illustrates another representation of a distributed filesystem in accordance with an example implementation of this disclosure. In FIG. 3, the element 302 represents memory resources (e.g., DRAM and/or other short-term memory) and processing (e.g., x86 processor(s), ARM processor(s), NICs, ASICs, FPGAs, and/or the like) resources of various node(s) (compute, storage, and/or VFS) on which resides a virtual filesystem, such as described regarding FIG. 2 above. The element 308 represents the one or more physical storage devices 216 which provide the long term storage of the virtual filesystem.

As shown in FIG. 3, the physical storage is organized into a plurality of distributed failure resilient address spaces (DFRASs) 518. Each of which comprises a plurality of chunks 310, which in turn comprises a plurality of blocks 312. The organization of blocks 312 into chunks 310 is only a convenience in some implementations and may not be done in all implementations. Each block 312 stores committed data 316 (which may take on various states, discussed below) and/or metadata 314 that describes or references committed data 316.

The organization of the storage 308 into a plurality of DFRASs enables high performance parallel commits from many—perhaps all—of the nodes of the virtual filesystem (e.g., all nodes $104_1$-$104_N$, $106_1$-$106_M$, and $120_1$-$120_J$ of FIG. 1 may perform concurrent commits in parallel). In an example implementation, each of the nodes of the virtual filesystem may own a respective one or more of the plurality of DFRAS and have exclusive read/commit access to the DFRASs that it owns.

Each bucket owns a DFRAS, and thus does not need to coordinate with any other node when writing to it. Each bucket may build stripes across many different chunks on many different SSDs, thus each bucket with its DFRAS can choose what "chunk stripe" to write to currently based on many parameters, and there is no coordination required in order to do so once the chunks are allocated to that bucket. All buckets can effectively write to all SSDs without any need to coordinate.

Each DFRAS being owned and accessible by only its owner bucket that runs on a specific node allows each of the nodes of the VFS to control a portion of the storage 308 without having to coordinate with any other nodes (except during [re]assignment of the buckets holding the DFRASs during initialization or after a node failure, for example, which may be performed asynchronously to actual reads/commits to storage 308). Thus, in such an implementation, each node may read/commit to its buckets' DFRASs independently of what the other nodes are doing, with no requirement to reach any consensus when reading and committing to storage 308. Furthermore, in the event of a failure of a particular node, the fact the particular node owns a plurality of buckets permits more intelligent and efficient redistribution of its workload to other nodes (rather the whole workload having to be assigned to a single node, which may create a "hot spot"). In this regard, in some implementations the number of buckets may be large relative to the number of nodes in the system such that any one bucket may be a relatively small load to place on another node. This permits fine grained redistribution of the load of a failed node according to the capabilities and capacity of the other nodes (e.g., nodes with more capabilities and capacity may be given a higher percentage of the failed nodes buckets).

To permit such operation, metadata may be maintained that maps each bucket to its current owning node such that reads and commits to storage 308 can be redirected to the appropriate node.

Load distribution is possible because the entire filesystem metadata space (e.g., directory, file attributes, content range in the file, etc.) can be broken (e.g., chopped or sharded) into small, uniform pieces (e.g., "shards"). For example, a large system with 30k servers could chop the metadata space into 128k or 256k shards.

Each such metadata shard may be maintained in a "bucket." Each VFS node may have responsibility over several buckets. When a bucket is serving metadata shards on a given backend, the bucket is considered "active" or the "leader" of that bucket. Typically, there are many more buckets than VFS nodes. For example, a small system with 6 nodes could have 120 buckets, and a larger system with 1,000 nodes could have 8k buckets.

Each bucket may be active on a small set of nodes, typically 5 nodes that that form a penta-group for that bucket. The cluster configuration keeps all participating nodes up-to-date regarding the penta-group assignment for each bucket.

Each penta-group monitors itself. For example, if the cluster has 10k servers, and each server has 6 buckets, each server will only need to talk with 30 different servers to maintain the status of its buckets (6 buckets will have 6 penta-groups, so 6*5=30). This is a much smaller number than if a centralized entity had to monitor all nodes and keep a cluster-wide state. The use of penta-groups allows performance to scale with bigger clusters, as nodes do not perform more work when the cluster size increases. This could pose a disadvantage that in a "dumb" mode a small cluster could actually generate more communication than there are physical nodes, but this disadvantage is overcome by sending just a single heartbeat between two servers with all the buckets they share (as the cluster grows this will change to just one bucket, but if you have a small 5 server cluster then it will just include all the buckets in all messages and each server will just talk with the other 4). The penta-groups may decide (i.e., reach consensus) using an algorithm that resembles the Raft consensus algorithm.

Each bucket may have a group of compute nodes that can run it. For example, five VFS nodes can run one bucket. However, only one of the nodes in the group is the controller/leader at any given moment. Further, no two buckets share the same group, for large enough clusters. If there are only 5 or 6 nodes in the cluster, most buckets may share backends. In a reasonably large cluster there many distinct node groups. For example, with 26 nodes, there are more than 64,000 (26!/5!*(26−5)!) possible five-node groups (i.e., penta-groups).

All nodes in a group know and agree (i.e., reach consensus) on which node is the actual active controller (i.e., leader) of that bucket. A node accessing the bucket may remember ("cache") the last node that was the leader for that bucket out of the (e.g., five) members of a group. If it accesses the bucket leader, the bucket leader performs the requested operation. If it accesses a node that is not the current leader, that node indicates the leader to "redirect" the access. If there is a timeout accessing the cached leader node, the contacting node may try a different node of the same penta-group. All the nodes in the cluster share common "configuration" of the cluster, which allows the nodes to know which server may run each bucket.

Each bucket may have a load/usage value that indicates how heavily the bucket is being used by applications running on the filesystem. For example, a server node with 11 lightly used buckets may receive another bucket of metadata to run before a server with 9 heavily used buckets, even though there will be an imbalance in the number of buckets used. Load value may be determined according to average response latencies, number of concurrently run operations, memory consumed or other metrics.

Redistribution may also occur even when a VFS node does not fail. If the system identifies that one node is busier than the others based on the tracked load metrics, the system can move (i.e., "fail over") one of its buckets to another server that is less busy. However, before actually relocating a bucket to a different host, load balancing may be achieved by diverting writes and reads. Since each write may end up on a different group of nodes, decided by the DFRAS, a node with a higher load may not be selected to be in a stripe to which data is being written. The system may also opt to not serve reads from a highly loaded node. For example, a "degraded mode read" may be performed, wherein a block in the highly loaded node is reconstructed from the other blocks of the same stripe. A degraded mode read is a read that is performed via the rest of the nodes in the same stripe, and the data is reconstructed via the failure protection. A degraded mode read may be performed when the read latency is too high, as the initiator of the read may assume that that node is down. If the load is high enough to create higher read latencies, the cluster may revert to reading that data from the other nodes and reconstructing the needed data using the degraded mode read.

Each bucket manages its own distributed erasure coding instance (i.e., DFRAS 518) and does not need to cooperate with other buckets to perform read or write operations. There are potentially thousands of concurrent, distributed erasure coding instances working concurrently, each for the different bucket. This is an integral part of scaling performance, as it effectively allows any large filesystem to be divided into independent pieces that do not need to be coordinated, thus providing high performance regardless of the scale.

Each bucket handles all the filesystems operations that fall into its shard. For example, the directory structure, file attributes and file data ranges will fall into a particular bucket's jurisdiction.

An operation done from any frontend starts by finding out what bucket owns that operation. Then the backend leader, and the node, for that bucket is determined. This determination may be performed by trying the last-known leader. If the last-known leader is not the current leader, that node may know which node is the current leader. If the last-known leader is not part of the bucket's penta-group anymore, that backend will let the front end know that it should go back to the configuration to find a member of the bucket's penta-group. The distribution of operations allows complex operations to be handled by a plurality of servers, rather than by a single computer in a standard system.

If the cluster of size is small (e.g., 5) and penta-groups are used, there will be buckets that share the same group. As the cluster size grows, buckets are redistributed such that no two groups are identical.

A failure domain is a set of storage devices that may fail (completely or become temporarily unavailable) due to a single component failure. If the failure of a single server will bring down a group of SSDs, this group of SSDs on the single server may be considered a failure domain. If a rack has a single network switch, this rack could be considered a failure domain if the failure of the switch results in the whole rack being inaccessible. A failure domain may be configured upon installation. The configuration of a failure domain may also be controlled from a Graphical User Interface (GUI), a Command Line Interface (CLI) or an Application Programming Interface (API). If no failure domain definition is set, a single server may be used as the failure domain. All of the SSDs present on that server may be treated as a large single SSD in terms of data placement.

Figure 4:
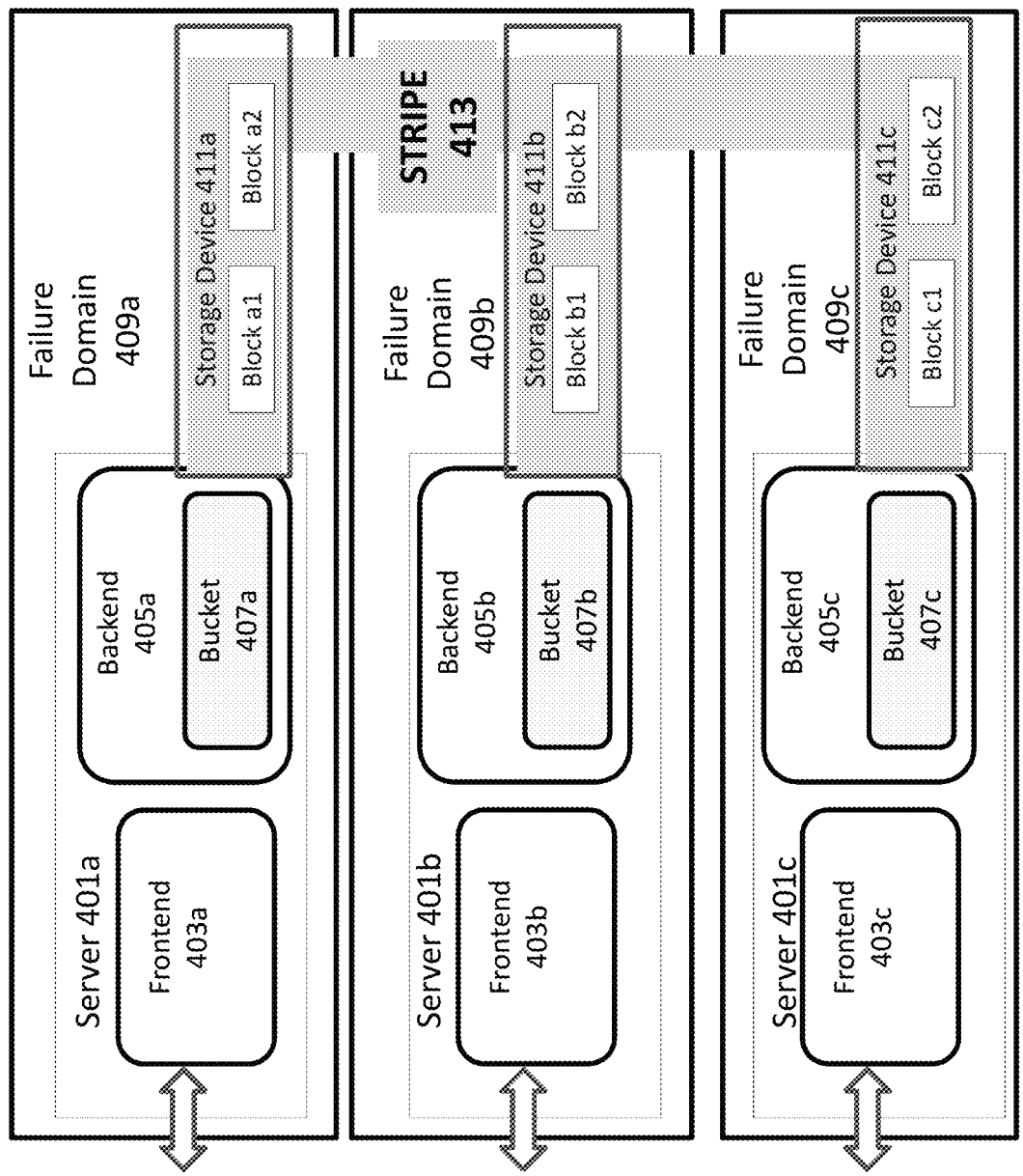
FIG. 4 illustrates another representation of a distributed filesystem in accordance with an example implementation of this disclosure.

FIG. 4 illustrates a representation of a distributed filesystem 400 in accordance with an example implementation of this disclosure. The distributed filesystem 400 comprises a first failure domain 409a, a second failure domain 409b and a third failure domain 409c.

The first failure domain 409a comprises at least one server 401a and at least one storage device 411a. The server 401a comprises a first frontend 403a and a first backend 405a. The first backend 405a comprises at least one bucket 407a. The at least one storage device 411a may comprise a plurality of solid-state devices. The at least one storage device 411a may be configured into a plurality of blocks, e.g., block a1 and block a2.

The second failure domain 409b comprises at least one server 401b and at least one storage device 411b. The server 401b comprises a second frontend 403b and a second backend 405b. The second backend 405b comprises at least one bucket 407b. The at least one storage device 411b may comprise a plurality of solid-state devices. The at least one storage device 411b may be configured into a plurality of blocks, e.g., block 131 and block b2.

The third failure domain 409c comprises at least one server 401c and at least one storage device 411c. The server 401c comprises a third frontend 403c and a third backend 405c. The third backend 405c comprises at least one bucket 407c. The at least one storage device 411c may comprise a plurality of solid-state devices. The at least one storage device 411c may be configured into a plurality of blocks, e.g., block c1 and block c2.

The buckets 407a, 407b and 407c are operable to build failure resilient stripes comprising a plurality of blocks. For example, bucket 407a in the first backend 405a may build stripe 411, which comprises blocks a1 and a2 of the first failure domain 409a; blocks 131 and b2 of second first failure domain 409b; and blocks c1 and c2 of the third failure domain 409a. Two or more blocks of the plurality of blocks a1, a2, b1, b2, c1 and c2 are configured to comprise error correction information.

Upon a failure of the first failure domain 409a, blocks a1 and a2 may be regenerated according to blocks 131, b2, c1 and/or c2. Upon a failure of the second failure domain 409b, blocks 131 and b2 may be regenerated according to blocks a1, a2, c1 and/or c2.

If the first failure domain 409a and the second failure domain 409b lose communication with each other, the third failure domain 409c is operable to determine which of the first failure domain 409a and the second failure domain 409b will continue running the system. Neither the first failure domain 409a nor the second failure domain 409b will rebuild the failure resilient stripe 413 unless permission is granted by the third failure domain 409c. Blocks c1 and c2 of the third failure domain 409c may or may not comprise data that is used in rebuilding stripe 413.

A bucket 407a in the first backend 405a may be the initial leader of the failure resilient stripe 413. Upon the failure of the first failure domain, however, a bucket 405b of the second backend 405b may become the leader of the rebuilt failure resilient stripe 413. The rebuilt failure resilient stripe 413 may not use blocks a1 and a2 if the first failure domain 409a is unavailable.

A large failure domain may be defined. For example, all of the SSDs on all the servers in that failure domain may be treated as if they were one large SSD storage device when data placement and stripe configuration is considered. This allows the filesystem to withstand a complete failure domain failure, as if there are no two data blocks for a same stripe on the same failure domain, it can always be rebuilt from the other failure domains.

Larger failure domains reduce the amount of stripe groups and increase the rebuild time. Because the rebuild process may run from all available computers in the other failure domains, all stripes may be rebuilt concurrently.

The widest stripe size may be limited by the amount of failure domain. For example, with 10 failure domains, 8 blocks of data could be protected with 2 blocks of error protection/correction (i.e., using an 8+2 stripe). Likewise, with 10 failure domains, 6 blocks of data could be protected with 4 blocks of error protection/correction (i.e., using a 6+4 stripe).

A failure domain may also limit the maximal amount of data placements from a single stipe in each failure domain. For example, an organization that has 3 or 4 data centers in a metro area may run the cluster across all its data centers, so in case one data center fails, the remaining data centers may continue to operate.

With 3 data centers, the filesystem can be protected with a 5+4 scheme, where no more than 3 pieces of data may be placed in the same failure domain. In this example, if a data center fails, there are still two others data centers with at least 6 pieces of data from each stripe that could be used to rebuild. The case of 3 data centers can also use 4+2 protection with no more than two pieces of data placed in the same failure domain. With 4 data centers, for example, 4+2 protection can be used with no more than two pieces of data placed in the same failure domain.

Two data centers may use 2+2 data protection with no more than two data pieces/blocks in each data centers. This case, however, requires the filesystem to determine which data center has stayed alive, thereby preventing a "split brain" situation where the cluster just splits into two datacenters that start working independently. To prevent a "split brain" scenario, another instance/server may be added on a third data center. The third data center may monitor/control communication with the two data centers, and in case first and second data centers lose communication with each other, that third data center (e.g., in a third failure domain) may decide (and let the servers in first and second data centers know) which half of the servers can continue running as a system. Unless the tie breaker node (third data center) grants a half cluster the permission to continue operating (and start rebuilding data), it won't be promoted to work on its own.

When rebuilding during such situations, as long as the remaining failure domain is all down, the filesystem will rebuild the data into the remaining failure domains that are up, to maintain high resiliency to individual server failures. Once that failure domain goes back online, data will be redistributed (rebuilt again) to maintain the requited maximum amount of data pieces out of each stripe on each failure domain.

An availability group is a group of servers that failover together and be considered a failure domain. While the availability group stays up, the availability group can access the data. When the availability group goes down together, other servers can still access the data over a defined data set of the system. Availability groups are a different way of controlling the data distribution. An availability group chooses a group of servers and a filesystem (e.g., a subset of a large namespace) that protect each other. An availability group may be in a specific room in that data center, for example. As long as these servers are up, all data for that filesystem will be stored in these servers, and not on other servers. So, even if other servers fail (e.g., other rooms of the data center lost power) that filesystem will still be available on these servers. An availability group may also be defines as all servers in a single rack. As long as that rack is up and running, service can continue operate from that rack independent of the other racks of the cluster.

Figure 5:
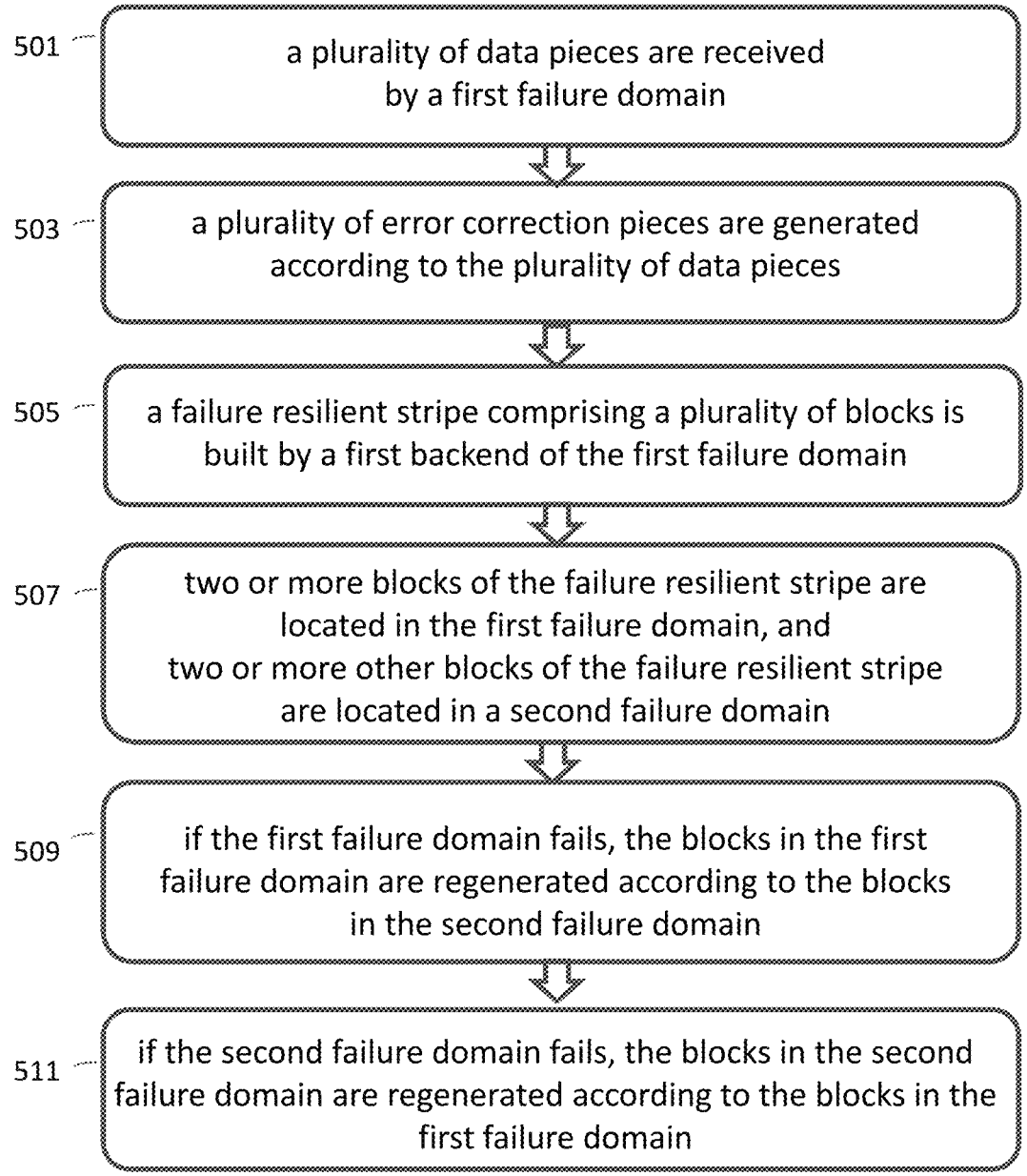
FIG. 5 is a flowchart illustrating an example method for generating a distributed filesystem in accordance with an example implementation of this disclosure.

FIG. 5 is a flowchart illustrating an example method for generating a distributed filesystem in accordance with an example implementation of this disclosure. In block 501, a plurality of data pieces are received by a first failure domain. In block 503, a plurality of error correction pieces are generated according to the plurality of data pieces. In block 505, a failure resilient stripe comprising a plurality of blocks is built by a first backend of the first failure domain. The failure resilient stripe may be built by a bucket in the first backend. This bucket in the first backend will be the leader of the failure resilient stripe until another bucket is promoted to leader.

Each block of the plurality of blocks comprises one data piece of the plurality of data pieces or one error correction piece of the plurality of error correction pieces. In block 507, two or more blocks of the failure resilient stripe are located in the first failure domain and two or more other blocks of the failure resilient stripe are located in a second failure domain.

In block 509 if the first failure domain fails, the blocks in the first failure domain are regenerated according to the blocks in the second failure domain. In block 511 if the second failure domain fails, the blocks in the second failure domain are regenerated according to the blocks in the first failure domain.

If there are only 2 failure domains in a network cluster, another device may detect that the first and second failure domains have lost communication with each other. This other device may then determine which of the first failure domain and the second failure domain will rebuild the failure resilient stripe. In certain embodiments, neither the first failure domain nor the second failure domain may rebuild the failure resilient stripe unless permission is granted by a third failure domain.

If the bucket leader is in a domain that fails, a bucket in another failure domain may be promoted to become a leader of the failure resilient stripe when it is rebuilt.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A system comprising:
   a first storage system;
   a second storage system;
   a first backend; and
   a second backend, wherein:
   the first backend and the second backend are operable to reach consensus that the first backend is an active controller,
   if a data access is directed to the second backend, the second backend redirects the data access to the first backend, and
   the first backend is operable to build a failure resilient stripe comprising a first set of blocks located in the first storage system and a second set of blocks located in the second storage system.

2. The system of claim 1, wherein the first storage system comprises a plurality of solid-state drives.

3. The system of claim 1, wherein the first storage system comprises one or more servers.

4. The system of claim 1, wherein the first storage system comprises a rack and a network switch.

5. The system of claim 1, wherein if the first storage system and the second storage system lose communication with each other, a third storage system is operable to determine which of the first storage system and the second storage system will continue running the system by rebuilding data.

6. The system of claim 1, wherein neither the first storage system nor the second storage system will rebuild the failure resilient stripe unless a permission is granted by a third storage system.

7. The system of claim 1, wherein the first backend comprises a bucket that initially builds the failure resilient stripe.

8. The system of claim 1, wherein the first backend comprises a bucket that is a leader of the failure resilient stripe.

9. The system of claim 1, wherein the second backend comprises a bucket that becomes a leader of the failure resilient stripe if the first storage system fails, wherein the second storage system comprises the second backend.

10. The system of claim 1, wherein the first storage system comprise an availability group.

11. A method comprising:
    reaching consensus, between a first backend and a second backend, that the first backend is an active controller;
    if a data access is directed to the second backend, redirecting the data access to the first backend; and
    using the first backend to build a failure resilient stripe comprising a first set of blocks located in a first storage system and a second set of blocks located in a second storage system.

12. The method of claim 11, wherein the first storage system comprises a plurality of storage devices.

13. The method of claim 11, wherein the first storage system comprises one or more servers.

14. The method of claim 11, wherein the first storage system comprises a rack and a network switch.

15. The method of claim 11, wherein the method comprises determining which of the first storage system and the second storage system will rebuild the failure resilient stripe if the first storage system and the second storage system lose communication with each other.

16. The method of claim 11, wherein neither the first storage system nor the second storage system will rebuild the failure resilient stripe unless a permission is granted by a third storage system.

17. The method of claim 11, wherein the method comprises building the failure resilient stripe via a bucket in the first backend.

18. The method of claim 11, wherein a bucket of the first backend is a leader of the failure resilient stripe.

19. The method of claim 11, wherein the method comprises promoting a bucket of the second backend to become a leader of the failure resilient stripe if the first storage system fails, wherein the second storage system comprises the second backend.

20. The method of claim 11, wherein the first storage system comprise an availability group.

* * * * *